United States Patent
Nakajima

(10) Patent No.: US 10,352,714 B2
(45) Date of Patent: Jul. 16, 2019

(54) ROUTE GUIDANCE DEVICE AND ROUTE GUIDANCE METHOD

(71) Applicant: Nissan Motor Co., Ltd., Yokohama-shi, Kanagawa (JP)

(72) Inventor: Toshiharu Nakajima, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 15/747,291

(22) PCT Filed: Jul. 27, 2015

(86) PCT No.: PCT/JP2015/071235
§ 371 (c)(1),
(2) Date: Jan. 24, 2018

(87) PCT Pub. No.: WO2017/017760
PCT Pub. Date: Feb. 2, 2017

(65) Prior Publication Data
US 2018/0224295 A1    Aug. 9, 2018

(51) Int. Cl.
*G01C 21/36* (2006.01)
*B60R 11/04* (2006.01)
(Continued)

(52) U.S. Cl.
CPC .......... *G01C 21/3602* (2013.01); *B60R 11/04* (2013.01); *G01C 21/3453* (2013.01);
(Continued)

(58) Field of Classification Search
CPC ............ G01C 21/3602; G01C 21/3453; G01C 21/3655; G01C 21/3658; B60R 11/04;
(Continued)

(56) References Cited

U.S. PATENT DOCUMENTS 5,343,399 A * 8/1994 Yokoyama ......... G01C 21/3629
340/990
7,974,780 B2  7/2011 Nakayama et al.
(Continued)

FOREIGN PATENT DOCUMENTS

JP    H06052492 A    2/1994
JP    2001082975 A   3/2001
(Continued)

*Primary Examiner* — Courtney D Heinle
(74) *Attorney, Agent, or Firm* — Young Basile Hanlon & MacFarlane, P.C.

(57) ABSTRACT

A route guidance unit includes: a detection unit configured to detect a position of a host vehicle; a guide unit configured to provide guidance on a travel route when a distance from the position of the host vehicle detected by the detection unit to a branch point on the travel route reaches a predetermined distance; and an accuracy determination unit configured to determine a degree of accuracy of the position of the host vehicle, wherein, when the accuracy determination unit determines that the degree of accuracy of the position is a predetermined threshold or less, the guide unit provides the guidance on the travel route at a point before the distance from the position of the host vehicle to the branch point reaches the predetermined distance.

3 Claims, 3 Drawing Sheets

(51) Int. Cl.
  *G01C 21/34* (2006.01)
  *G05D 1/00* (2006.01)
  *G06K 9/00* (2006.01)
  *G08G 1/0969* (2006.01)

(52) U.S. Cl.
  CPC ..... *G01C 21/3655* (2013.01); *G01C 21/3658* (2013.01); *G05D 1/0088* (2013.01); *G06K 9/00791* (2013.01); *G08G 1/0969* (2013.01); *B60R 2300/804* (2013.01)

(58) Field of Classification Search
  CPC ............ B60R 2300/804; G05D 1/0088; G06K 9/00791; G08G 1/0969

See application file for complete search history.

(56) References Cited

U.S. PATENT DOCUMENTS

| | | | | |
|---|---|---|---|---|
| 2001/0023380 | A1* | 9/2001 | Mizutani | G05D 1/0274 701/23 |
| 2009/0265070 | A1* | 10/2009 | Okada | B60W 40/10 701/70 |
| 2014/0350845 | A1* | 11/2014 | Hayashi | G01C 21/3438 701/428 |
| 2016/0327402 | A1* | 11/2016 | Funabiki | G01C 21/365 |
| 2018/0224295 | A1* | 8/2018 | Nakajima | G06K 9/00791 |

FOREIGN PATENT DOCUMENTS

| | | |
|---|---|---|
| JP | 2001255937 A | 9/2001 |
| JP | 2001357497 A | 12/2001 |
| JP | 2007126086 A | 5/2007 |
| JP | 2007305079 A | 11/2007 |
| JP | 2009133801 A | 6/2009 |
| WO | 2010050065 A1 | 5/2010 |
| WO | 2015118859 A1 | 8/2015 |

* cited by examiner

ROUTE GUIDANCE DEVICE AND ROUTE GUIDANCE METHOD

TECHNICAL FIELD

The present invention relates to a route guidance device and a route guidance method.

BACKGROUND

Navigation devices for indicating travel routes to destinations are known. Japanese Patent Application Publication No. 2009-133801 discloses a navigation device that, when there is a branch point on a travel route, indicates a distance to the branch point and directs a host vehicle to a lane to travel upon approaching the branch point.

According to the navigation device disclosed in Japanese Patent Application Publication No. 2009-133801, a driver can recognize the lane to travel when approaching the branch point, but is confused as to which point is appropriate to change lanes. A guidance point for urging the driver to change lanes may be preset; however, accurate guidance may not be provided to the driver if the position of the host vehicle is not estimated correctly.

SUMMARY

The present invention has been made in view of the conventional problems. An object of the present invention is to provide a route guidance device and a route guidance method capable of leading a host vehicle to an appropriate lane to travel even when a position of the host vehicle is uncertain.

A route guidance device according to an aspect of the present invention estimates a position of a host vehicle and a travel lane, determines accuracy of the estimated position of the host vehicle, and when it is determined that the determined accuracy of the travel lane is a predetermined threshold or less, leads the host vehicle to change lanes toward a travel route at a point before a distance from the position of the host vehicle to a branch point reaches a predetermined distance. When the route guidance device determines that the accuracy of the travel lane of the host vehicle is the predetermined threshold or less, the route guidance device leads the host vehicle to change the travel lane to a rightmost lane or a leftmost lane.

The present invention can lead the host vehicle to an appropriate lane to travel even when the position of the host vehicle is uncertain.

DETAILED DESCRIPTION OF THE EMBODIMENTS

Figure 1:
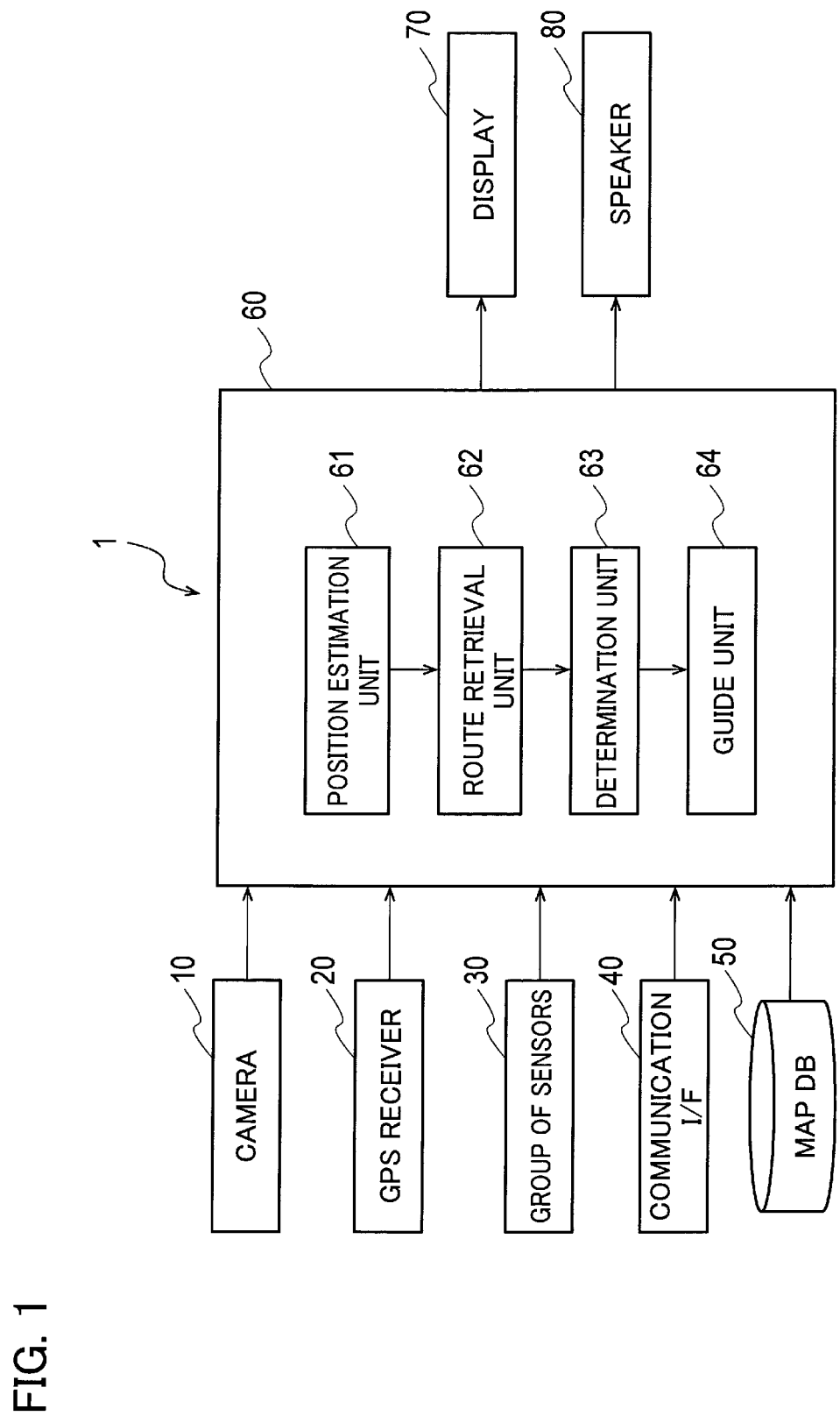
FIG. 1 is a configuration diagram of a route guidance device according to an embodiment of the present invention.

An embodiment of the present invention will be described below with reference to the drawings. The same elements in the descriptions of the drawings are designated by the same reference numerals, and explanations thereof are not repeated below.

A route guidance device 1 according to the present embodiment is described below with reference to FIG. 1. As shown in FIG. 1, the route guidance device 1 includes a camera 10, a GPS receiver 20, a group of sensors 30, a communication I/F 40, a map database 50, a navigation device 60, a display 70 which provides a vehicle occupant with various pieces of information, and a speaker 80 which outputs speech sounds to inform the occupant of the information.

The camera 10 (a detection unit) is a camera including an imaging device such as a charge-coupled device (CCD) and a complementary metal oxide semiconductor (CMOS), and images views in front of the host vehicle. The camera 10 has an image processing function and detects white lines and objects on the grounds (such as road shoulders, walkways, and road signs) from captured images. The camera 10 outputs the detected data to the navigation device 60. The camera 10 may be installed at a position where peripheral views can be captured, instead of front views.

The GPS receiver 20 (a detection unit) receives radio waves from a satellite so as to detect a current position of the host vehicle on the ground. The GPS receiver 20 outputs the detected current position of the host vehicle to the navigation device 60.

The group of sensors 30 includes a speed sensor, an acceleration sensor, and a gyro sensor. The group of sensors 30 detects a speed, a rate of acceleration, and an attitude of the host vehicle by the respective sensors, and outputs the detected data to the navigation device 60.

The communication I/F 40 is a communication device which wirelessly communicates signals with external devices. The communication I/F 40 externally receives various pieces of information, such as traffic information including traffic congestion and traffic restrictions, and weather information, through an intelligent transport system (ITS) which transmits various data in real time. The ITS includes Vehicle Information and Communication System (VICS: registered trademark) and telematics. The communication I/F 40 outputs the received information to the navigation device 60.

The map database 50 stores map information including road information and facility information. The map database 50 stores various kinds of data required for route guidance, such as road data and icon data indicated on a map. The road data stored in the map database 50 includes information about the number of lanes of roads, widths of roads, undulations of roads, and the like.

The navigation device 60 determines a travel route to a destination preliminarily set by the occupant. In particular, the navigation device 60 indicates a travel route to a destination on the display 70 or a mark denoting the current position of the host vehicle retrieved by use of the positional information acquired from the GPS receiver 20, the information acquired from the communication I/F 40, the map information acquired from the map database 50, and the like.

The navigation device 60 is a computer including a CPU, ROM and RAM, and a data path and an input/output interface connecting these elements. The CPU implements predetermined processing in accordance with programs stored in the ROM. The navigation device 60 functionally includes a position estimation unit 61, a route retrieval unit 62, an accuracy determination unit 63, and a guide unit 64.

The position estimation unit 61 estimates a current position of the host vehicle per lane. In particular, the position estimation unit 61 estimates the current position of the host vehicle per lane by use of the information about white lines acquired from the camera 10, the positional information acquired from the GPS receiver 20, and the map information acquired from the map database 50.

The route retrieval unit 62 retrieves per lane a travel route to a destination starting from the current position of the host vehicle estimated by the position estimation unit 61 by use of the map information stored in the map database 50. The route retrieval unit 62 may retrieve the travel route per lane at regular intervals, since a retrieval load increases when the travel route to the destination is retrieved per lane constantly. For example, the retrieval unit 62 may retrieve the travel route per lane when a distance to a branch point or an intersection reaches three kilometers. The distance is not limited to three kilometers and may be any distance sufficient for the host vehicle to change lanes in advance. Alternatively, the retrieval unit 62 may retrieve the travel route per lane per kilometer. The distance is not limited to one kilometer when the retrieval load can be reduced.

The accuracy determination unit 63 determines accuracy (probability or certainty) of the travel lane of the host vehicle estimated by the position estimation unit 61. As used herein, the phrase "accuracy (probability or certainty) of the estimated travel lane" is a degree of accuracy in the estimation of the travel lane. The accuracy determination unit 63 determines whether the degree of accuracy of the estimated travel lane is greater than a threshold. The degree of accuracy of the estimated travel lane greater than the threshold means that the estimation of the travel lane of the host vehicle is accurate. The degree of accuracy of the estimated travel lane less than or equal to the threshold means that the travel lane of the host vehicle is uncertain. A determination method is described in detail below.

The accuracy determination unit 63 determines the accuracy of the estimated travel lane depending on the shade of white lines acquired from the camera 10. The accuracy determination unit 63 determines that the accuracy of the estimated travel lane is low when the shade of the white lines is lighter than a normal level, since there is a possibility that wrong objects have been detected by the camera 10 as write lines. The accuracy determination unit 63 may determine whether the shade of white lines is lighter than a normal level through template matching.

The accuracy determination unit 63 also determines that the accuracy of the estimated travel lane is low when no white line is captured in the camera image. When there are other vehicles on both sides of the host vehicle due to traffic congestion, for example, white lines may not be captured in the camera image because the white lines are hidden by the other vehicles. The accuracy determination unit 63 thus determines that the accuracy of the estimated travel lane is low under such situations.

The accuracy determination unit 63 also determines that the accuracy of the estimated travel lane is low when the host vehicle is against the sun, since the camera 10 may not image objects appropriately because of backlight.

The accuracy determination unit 63 also determines that the accuracy of the estimated travel lane is low when the recognition by the camera 10 differs from that of the navigation device 60. For example, while the navigation device 60 recognizes that the host vehicle is traveling on a four-lane road, the camera 10 may recognize that the host vehicle is traveling on a five-lane road. When a shoulder of a road is narrow and a walkway is wide, the camera 10 may recognize the walkway as one of lanes of the roadway. The accuracy determination unit 63 thus determines that the accuracy of the estimated travel lane is low when there is a difference in the recognition between the camera 10 and the navigation device 60.

The accuracy determination unit 63 determines the accuracy of the estimated travel lane depending on corrected values in positional correction by use of objects on the ground. In particular, the position estimation unit 61 can correct a current position of the host vehicle by use of objects on the ground. The position estimation unit 61 calculates a distance to an object on the ground such as a road sign or an information sign, and corrects the current position in the traveling direction with the calculated distance. When the corrected value is greater than a normal value, the accuracy determination unit 63 determines that the accuracy of the estimated travel lane is low.

As described above, the accuracy determination unit 63 determines whether the degree of accuracy of the estimated travel lane is greater than the threshold. The threshold used for the determination can be obtained through preliminary experiments or simulations. The threshold may vary depending on the traveling situations (such as an expressway and a local road).

The guide unit 64 provides route guidance to travel at a branch point or an intersection on a travel route. For example, the guide unit 64 leads the host vehicle to an appropriate lane at a branch point where a road is branching into two directions, or leads the host vehicle to go straight, turn left, or turn right at an intersection.

The display 70 indicates a travel route to a destination set by the navigation device 60.

The speaker 80 outputs speech sounds to inform the occupant of a direction to a destination along a travel route or a direction at a branch point or an intersection.

Figure 2:
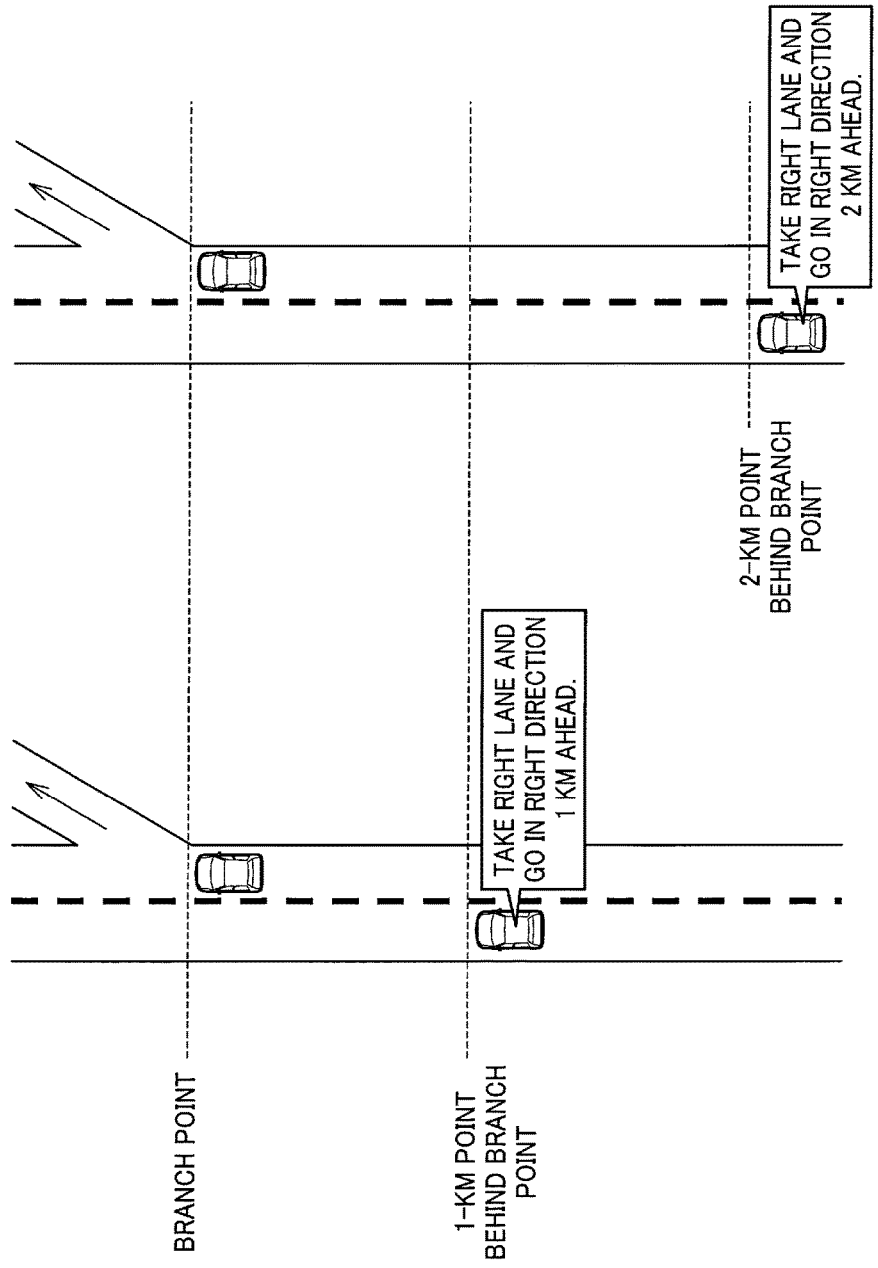
FIG. 2(a) and FIG. 2(b) are views for illustrating operations of the route guidance device according to the embodiment of the present invention.

Next, examples of operations of the route guidance device 1 configured as described above are described with reference to FIG. 2(*a*) and FIG. 2(*b*). FIG. 2(*a*) and FIG. 2(*b*) are illustrated with a case in which a lane of a road branching into a right direction is set as a travel route.

As shown in FIG. 2(*a*), when the host vehicle is approaching a branch point, the route retrieval unit 62 retrieves a travel route per lane. The accuracy determination unit 63 determines whether the degree of accuracy of the estimated travel lane is greater than the threshold. When the degree of accuracy of the estimated travel lane is greater than the threshold, and the distance from the current position to the branch point reaches a predetermined distance (for example, one kilometer), the guide unit 64 informs the driver, "Take the right lane, and go in the right direction one kilometer ahead", as shown in FIG. 2(*a*). The present embodiment exemplifies a case, as normal guidance, in which the lane change is informed when the distance from the current position to the branch point reaches one kilometer. Although the present embodiment exemplifies the case in which the predetermined distance is one kilometer, the predetermined distance is not limited to one kilometer and may be any distance which is sufficient for the driver to change lanes safely.

When the degree of accuracy of the estimated travel lane is less than or equal to the threshold, the guide unit 64 leads the host vehicle to change lanes at an earlier point than the point where the normal guidance is provided as illustrated in FIG. 2(*a*). When the degree of accuracy of the estimated travel lane is less than or equal to the threshold, and the distance from the current position to the branch point reaches a distance longer than one kilometer used in the normal guidance as illustrated in FIG. 2(*a*) (in this example, two kilometers), the guide unit 64 informs the driver, "Take the right lane, and go in the right direction two kilometers ahead", as shown in FIG. 2(b). The guide unit 64 leads the host vehicle to change the lanes at the earlier point than the point of the normal guidance when the estimated travel lane of the host vehicle is uncertain. The guide unit 64 thus can lead the host vehicle to an appropriate direction to travel even when the estimation of the travel lane of the host vehicle is not accurate.

Although the present embodiment exemplifies the case of the two-lane road, the present invention may be applicable to any case regardless of the number of lanes. For example, in a case in which one of three or more lanes of a road branching into a right direction is set as a travel route, and the degree of accuracy of the estimated travel lane is less than or equal to the threshold, the guide unit 64 informs the driver, "Take the rightmost lane", at an earlier point than the point of the normal guidance regardless of which lane the host vehicle is traveling. The guide unit 64 thus can lead the host vehicle to an appropriate direction regardless of which lane the host vehicle is traveling even when the estimation of the travel lane of the host vehicle is not accurate.

The guide unit 64 may change the guidance start point depending on the number of lanes. The guide unit 64 may inform the host vehicle of a lane change at an earlier point as the number of lanes increases. For example, when the host vehicle is traveling in the leftmost lane in a five-lane road and is to travel in a lane branching into the right direction at a branch point, the host vehicle should change lanes four times. In order to allow the driver to change lanes with sufficient time, the route guidance is preferably provided to the driver at a point having a sufficient distance from the current position to the branch point. The guide unit 64 starts providing the route guidance at an earlier point as the number of lanes increases, so as to lead the host vehicle to an appropriate direction to travel with sufficient time even when the estimation of the travel lane of the host vehicle is not accurate. The guide unit 64 thus can reduce the risk that the host vehicle misses traveling in an appropriate direction.

The guide unit 64 may lead the host vehicle to change the current lane to the rightmost lane or the leftmost lane when the degree of accuracy of the estimated travel lane is less than or equal to a predetermined time threshold. The change to the rightmost lane or the leftmost lane resets the accuracy in the estimation of the travel lane, so that the accuracy determination unit 63 can determines the accuracy of the estimated travel lane over again.

Figure 3:
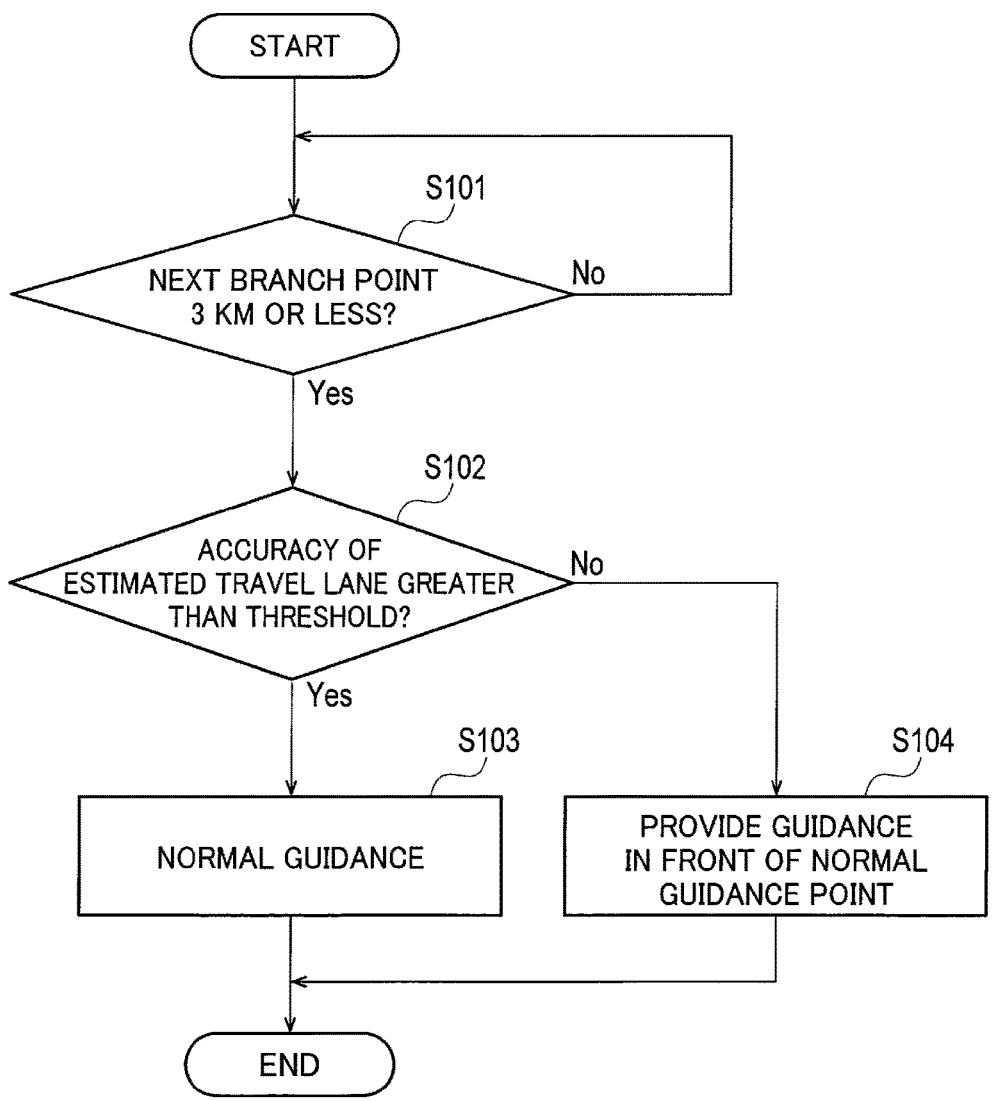
FIG. 3 is a flow chart for illustrating an operation of the route guidance device according to the embodiment of the present invention.

Next, an example of the operation of the route guidance device 1 is described with reference to the flow chart shown in FIG. 3. The process shown in the flow chart starts when a travel route to a destination is set.

In step S101, the route retrieval unit 62 determines whether the distance from the current position of the host vehicle to a next branch point is three kilometers or less. When the distance to the next branch point is greater than three kilometers (No in step S101), the route retrieval unit 62 remains on standby. When the distance to the next branch point is three kilometers or less (Yes in step S101), the route retrieval unit 62 retrieves a travel route per lane.

In step S102, the accuracy determination unit 63 determines whether the degree of accuracy of the estimated travel lane is greater than the threshold. When the degree of accuracy of the estimated travel lane is greater than the threshold (Yes in step S102), the process proceeds to step S103. When the degree of accuracy of the estimated travel lane is less than or equal to the threshold (No in step S102), the process proceeds to step S104.

In step S103, the guide unit 64 provides the route guidance as normal guidance when the distance from the current position of the host vehicle to the next branch point reaches one kilometer.

In step S104, the guide unit 64 provides the route guidance before the distance from the current position of the host vehicle to the next branch point reaches one kilometer.

As described above, the route guidance device 1 according to the present embodiment can achieve the following advantageous effects.

The route guidance device 1 changes a guidance start point depending on the accuracy in estimation of a current position of the host vehicle. When the degree of accuracy of the estimated current position is greater than the threshold, the route guidance device 1 provides route guidance when a distance from the current position to a branch point reaches a predetermined distance. When the degree of accuracy of the estimated current position is less than or equal to the threshold, the route guidance device 1 provides route guidance before reaching the predetermined distance. Accordingly, the route guidance device 1 can lead the host vehicle to an appropriate lane to travel at the branch point or the intersection even when the estimation of the current position of the host vehicle is not accurate.

The route guidance device 1 detects a travel lane as a current position of the host vehicle and changes a guidance start point depending on the accuracy in the estimation of the detected travel lane. Accordingly, the route guidance device 1 can lead the host vehicle to an appropriate lane to travel at the branch point or the intersection even when the estimation of the travel lane of the host vehicle is not accurate.

The route guidance device 1 leads the host vehicle to an appropriate lane to travel at a branch point or an intersection regardless of which travel lane the host vehicle is traveling. Accordingly, the route guidance device 1 can lead the host vehicle to an appropriate lane to travel at the branch point or the intersection even when the estimation of the travel lane of the host vehicle is not accurate.

The route guidance device 1 leads the host vehicle to change the current lane to the rightmost lane or the leftmost lane when the degree of accuracy of the estimated travel lane is a predetermined time threshold or less. Accordingly, the accuracy in the estimation of the travel route is reset, so that the route guidance device 1 can determines the accuracy of the estimated travel lane over again.

While the embodiment of the present invention has been described above, it should be understood that the present invention is not intended to be limited to the descriptions and the drawings composing part of this disclosure. Various alternative embodiments, examples, and technical applications will be apparent to those skilled in the art according to this disclosure.

Although the present embodiment exemplified the case in which the map database 50 is stored in the route guidance device 1, the map database 50 may be stored on a server. When the map database 50 is stored on the server, the navigation device 60 can acquire the map information on demand through communications.

The present invention is applicable to an autonomous vehicle which is autonomously driven along a travel route. When the present invention is applied to an autonomous vehicle, the autonomous vehicle can autonomously change lanes when a degree of accuracy of an estimated travel lane is greater than a threshold and a distance from a current position to a branch point reaches one kilometer. The autonomous vehicle can autonomously change lanes when the degree of accuracy of the estimated travel lane is less than or equal to the threshold and the distance from the current position to the branch point reaches two kilometers. The autonomous vehicle can change the point of the autonomous lane change to an earlier point as the number of lanes increases.

REFERENCE SIGNS LIST

10 CAMERA
20 GPS RECEIVER
63 ACCURACY DETERMINATION UNIT
64 GUIDE UNIT

The invention claimed is:

1. A route guidance device used for a vehicle which provides a travel route to a predetermined destination or an autonomous vehicle which is autonomously driven along the travel route, the route guidance device comprising a computer programmed to:
   estimate a position of a host vehicle and a travel lane;
   lead the host vehicle to change lanes toward a branch direction to the predetermined destination when a distance from the position of the host vehicle to a branch point on the travel route reaches a predetermined distance; and
   determine lateral accuracy of the travel lane of the host vehicle,
   wherein, after the lateral accuracy of the travel lane of the host vehicle is a predetermined threshold or less for a predetermined time, the computer is programmed to lead the host vehicle to change lanes toward the branch direction to the predetermined destination at a point before the distance from the position of the host vehicle to the branch point reaches the predetermined distance,
   wherein, after the lateral accuracy of the travel lane of the host vehicle is the predetermined threshold or less for the predetermined time and the branch point is in a right direction, the computer is programmed to lead the host vehicle to change the travel lane to a rightmost lane, and
   wherein, after the lateral accuracy of the travel lane of the host vehicle is the predetermined threshold or less for the predetermined time and the branch point is in a left direction, the computer is programmed to lead the host vehicle to change the travel lane to a leftmost lane.

2. The route guidance device according to claim 1, wherein the computer is programmed to provide guidance on the travel route regardless of the estimated travel lane.

3. A route guidance method used for a vehicle which provides a travel route to a predetermined destination or an autonomous vehicle which is autonomously driven along the travel route, the route guidance method comprising:
   estimating a position of a host vehicle and a travel lane;
   determining lateral accuracy of the estimated travel lane of the host vehicle; and
   after the determined lateral accuracy of the travel lane of the host vehicle is a predetermined threshold or less for a predetermined time, leading the host vehicle to change lanes toward a branch direction to the predetermined destination before a distance from the position of the host vehicle to a branch point on the travel route reaches a predetermined distance,
   wherein after the lateral accuracy of the travel lane of the host vehicle is the predetermined threshold or less for the predetermined time and the branch point is on right direction, leading the host vehicle to change the travel lane to a rightmost lane, and
   wherein after the lateral accuracy of the travel lane of the host vehicle is the predetermined threshold or less for the predetermined time and the branch point is on left direction, leading the host vehicle to change the travel lane to a leftmost lane.

* * * * *